March 12, 1968  D. R. DREITZLER ET AL  3,372,571
INFINITE RESOLUTION, AUTOMATIC, CALIBRATION, CURVE PLOTTER
Filed June 28, 1966
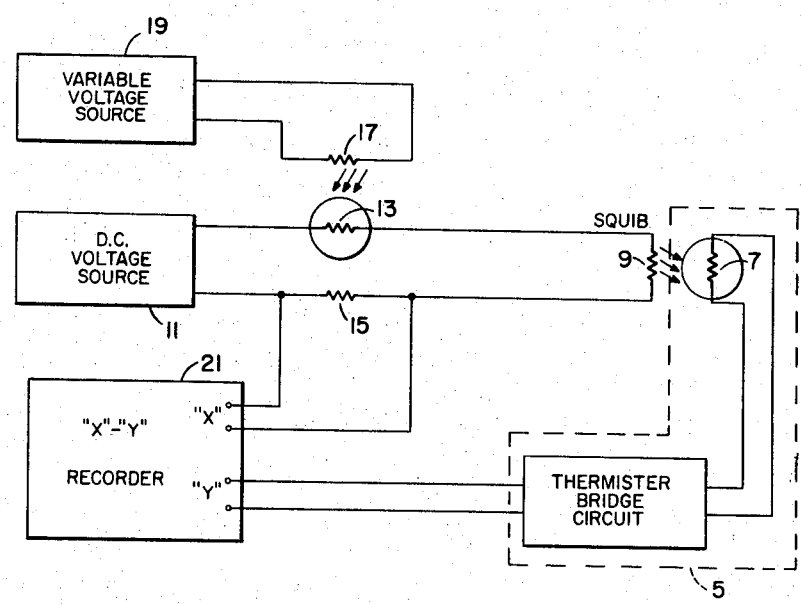
David R. Dreitzler
Roy E. Yell,
INVENTORS.
BY Harry M. Saragovitz
Edward J. Kelly
Herbert Berl
Jack W. Voigt United States Patent Office
3,372,571
Patented Mar. 12, 1968

3,372,571
INFINITE RESOLUTION, AUTOMATIC, CALIBRATION, CURVE PLOTTER
David R. Dreitzler and Roy E. Yell, Huntsville, Ala., assignors to the United States of America as represented by the Secretary of the Army
Filed June 28, 1966, Ser. No. 561,299
5 Claims. (Cl. 73—1)

This invention relates to a calibration device and more specifically to an automatic, calibration, curve plotter having infinite resolution for calibrating heat sensors such as a thermistor bridge circuit.

When calibrating a heat sensing device such as a thermistor bridge circuit which is used to monitor a squib wire, it is often necessary to obtain a calibration curve. This curve is a plot of DC squib wire current vs. thermistor bridge circuit output. In the past, the resolution and ease of varying squib wire current has left much to be desired. In order to obtain a satisfactory plot, it is necessary to have a smoothly increasing current to the squib wire, and using conventional means such as a potentiometer for varying the current results in a very uneven and hard to read curve.

The present invention fulfills the need for a device to plot automatically an infinite resolution calibration curve of a heat sensing device, and the device comprises a first voltage source, having first and second outputs, a thermistor connected to the first output of said first voltage source, a first resistor connected to the second output of said first voltage source, a thermoelectric device connected to the thermistor and first resistor, a variable heat source means comprising a second resistor and a variable voltage source thermally coupled to the thermistor, an X and Y axis recorder having the X axis input connected across the first resistor and the Y axis input connected to a heat sensing device which is to be calibrated.

It is therefore an object of this invention to provide a heat sensor calibration device which has an infinite resolution.

It is further an object of this invention to provide a calibration curve plotter device which is automatic throughout the curve plotting period.

Still another object of this invention is to provide an infinite resolution, automatic, calibration, curve plotter which gives a smooth curve through the period of plotting.

Other objects and many of the attendant advantages of this invention will be readily appreciated as the same becomes better understood by reference to the following detailed description when considered in connection with the accompanying drawing in which the single figure is a schematic diagram of an infinite resolution, automatic, calibration, curve plotter according to the present invention.

In order to better understand the operation of the system described in the figure, a description of its components is first presented. As shown in the figure, a heat sensing device, in this case, a thermistor bridge circuit 5 having a thermistor 7 comprising one leg of bridge 5 is thermally linked to a squib bridge wire 9 which is used as the heat source for calibrating bridge 5. Squib wire 9 is connected to the output of a DC voltage source 11 in series with a thermistor 13 and a resistor 15. Thermistor 13 is thermally linked to a load resistor 17 which is connected across a variable voltage source 19 such as a variac. An X-Y recorder 21, such as the Mosely 135, is the final element of the plotter and is connected with the X input terminals across resistor 15 while the Y input terminals are connected to the output of the heat sensor being calibrated, in this case bridge circuit 5.

In operation

The operation of the invention occurs in the following manner. The variable voltage source 19 is set for a predetermined voltage output, and as the current flows through load resistor 17, it dissipates heat at a rate which gradually increases. This dissipated heat is sensed by thermistor 13 which is thermally linked to resistor 17, and due to the inherent action of a thermistor, the resistance drops thus allowing current to flow through squib wire 9 from the DC voltage source 11. As the heat dissipation rate of resistor 17 gradually increases, the current flow through squib wire 9 gradually increases thus gradually heating squib wire 9. Since squib wire 9 is thermally linked to thermistor 7, the resistance of thermistor 7 is lowered thus unbalancing bridge 5 and giving an output indicative of the heating of squib wire 9. This output is fed to the Y axis input of recorder 21 simultaneously with the current indication of squib wire 9 at the X axis input thus giving an automatic plot over a given current range of squib wire 9 and having an infinite resolution due to the smooth, constant, increase in the heat dissipated by resistor 17 and sensed by thermistor 13.

Thus, it can be seen from the above disclosure that the calibration plot of the output of a heat sensing device is a smooth automatic plot having infinite resolution.

While the invention has been described with reference to a preferred embodiment thereof, it will be apparent that various modifications and other embodiments thereof will occur to those skilled in the art within the scope of the invention. Accordingly, it is desired that the scope of this invention be limited only by the appended claims.

What is claimed is:

1. An infinite resolution, automatic, calibration, curve plotter comprising:
   a first voltage source having first and second output connections; a thermistor connected to said first output connection of said first voltage source; a resistor connected to said second output connection of said first voltage source; a thermoelectric device having first and second input connections, said first input connection being connected to said thermistor, and said second input connection being connected to said resistor; a variable heat source means thermally coupled to said thermistor for smoothly increasing the temperature to the thermistor at a steady rate; an X and Y axis input recorder, said X axis input being connected across said resistor; and a heat sensing circuit, which is to be calibrated, connected to said Y axis input of said recorder, said heat sensing circuit being thermally coupled to said thermoelectric device whereby a calibration curve of said heat sensing circuit is obtained as the heat intensity applied to said thermistor is increased.

2. An infinite resolution, automatic, calibration, curve plotter as set forth in claim 1, wherein said first voltage source is a DC voltage source.

3. An infinite resolution, automatic, calibration, curve plotter as set forth in claim 1, wherein said heat source means comprises a variable voltage source having first and second output connections with a load resistor connected across said first and second output connections of said variable voltage source, said load resistor being thermally connected to said thermistor whereby current passing through said thermistor and consequently through said thermoelectric device is smoothly and steadily increased automatically due to the heating rate of said load resistor determined by the appropriate setting of said variable voltage supply.

4. An infinite resolution, automatic, calibration, curve plotter as set forth in claim 1, wherein said thermoelectric device is a squib bridge wire to produce heat necessary for calibration of said heat sensing device.

5. An infinite resolution, automatic, calibration curve plotter as set forth in claim 4, wherein said heat sensing circuit is a thermistor bridge circuit having a heat sensing thermistor as a leg thereof, and said thermistor being thermally coupled to said squib bridge wire.

References Cited

UNITED STATES PATENTS

| | | | |
|---|---|---|---|
| 1,390,743 | 9/1921 | Allcutt | 324—63 |
| 2,673,960 | 3/1954 | Doblmair | 324—158 |
| 3,067,604 | 12/1962 | Brunson. | |

LOUIS R. PRINCE, *Primary Examiner.*

C. S. SWISHER, *Assistant Examiner.*